(12) United States Patent
Shestak et al.

(10) Patent No.: US 9,411,093 B2
(45) Date of Patent: Aug. 9, 2016

(54) DISPLAY APPARATUS

(71) Applicant: SAMSUNG ELECTRONICS CO., LTD., Suwon-si (KR)

(72) Inventors: Sergey Shestak, Suwon-si (KR); Dae-sik Kim, Hwaseong-si (KR); Seong-woo Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 207 days.

(21) Appl. No.: 14/330,164

(22) Filed: Jul. 14, 2014

(65) Prior Publication Data

US 2015/0192827 A1    Jul. 9, 2015

(30) Foreign Application Priority Data

Jan. 3, 2014  (KR) .......................... 10-2014-0000896

(51) Int. Cl.
  *G02F 1/1335*  (2006.01)
  *F21V 8/00*  (2006.01)
  *G02B 27/22*  (2006.01)
  *H04N 13/04*  (2006.01)
  *H04N 13/00*  (2006.01)

(52) U.S. Cl.
  CPC ............ *G02B 6/0076* (2013.01); *G02B 6/0038* (2013.01); *G02B 27/225* (2013.01); *H04N 13/0011* (2013.01); *H04N 13/0402* (2013.01); *H04N 2013/0465* (2013.01)

(58) Field of Classification Search
  CPC ................................................ G02F 1/133602
  See application file for complete search history.

(56) References Cited

U.S. PATENT DOCUMENTS

| | | | |
|---|---|---|---|
| 6,104,463 A | | 8/2000 | Shibahara |
| 2012/0105428 A1 | | 5/2012 | Fleck et al. |
| 2012/0314017 A1 | | 12/2012 | Gross |
| 2013/0038811 A1 | | 2/2013 | Sugita et al. |
| 2015/0293402 A1* | 10/2015 | Shinkai | ................ G02B 3/005 349/15 |
| 2015/0326850 A1* | 11/2015 | Kim | ................ H04N 13/0452 349/15 |

FOREIGN PATENT DOCUMENTS

| | | |
|---|---|---|
| JP | 3011161 B2 | 12/1999 |
| KR | 10-2012-0104480 A | 9/2012 |
| KR | 10-2013-0036677 A | 4/2013 |

* cited by examiner

*Primary Examiner* — Timothy L Rude
(74) *Attorney, Agent, or Firm* — Sughrue Mion, PLLC

(57) ABSTRACT

A display apparatus is disclosed. The display apparatus includes a transmissive image panel configured to display a multi-view image, and a first transmissive backlight panel and the second transmissive backlight panel arranged at a predetermined distance from the transmissive image panel, and the first transmissive backlight panel and the second transmissive backlight panel are in parallel to the transmissive image panel, wherein the first backlight panel distributes the multi-view image in a first viewing zone differently from the second backlight panel distribution of the multi-view image in a second viewing zone.

15 Claims, 11 Drawing Sheets

DISPLAY APPARATUS

CROSS-REFERENCE TO RELATED APPLICATIONS

This application claims priority from Korean Patent Application No. 10-2014-0000896, filed on Jan. 3, 2014, in the Korean Intellectual Property Office, the entire disclosure of which is incorporated herein by reference.

BACKGROUND

1. Field

Apparatuses and methods consistent with the exemplary embodiments relate to a display apparatus. In particular, exemplary embodiments relate to a transparent display apparatus.

2. Description of the Related Art

In electronic technologies, various types of display apparatuses have been developed for use in various fields. In particular research on next-generation display apparatuses has accelerated.

A transparent display apparatus refers to an apparatus that has transparency in which a background behind the apparatus is seen through the apparatus. In a related art, a display panel is formed of an opaque semiconductor compound such as silicon (Si), gallium arsenide (GaAs), etc. Even though various application fields have been introduced, related art display panels are not sufficient to cover the various application fields. Thus, new types of electronic devices have been developed, including, a transparent display apparatus.

A transparent display apparatus includes a transparent oxide semiconductor layer with transparency. When the transparent display apparatus is used, a user may see information through a screen of the transparent display apparatus while seeing a background behind the apparatus. Thus, spatial and temporal restriction of related at display apparatuses may be overcome.

A transparent display apparatus may be conveniently used in various environments. For example, when a window in a store is embodied as a transparent display apparatus, if a user passes, an advertising phrase may be displayed in the window to attract user interest. In addition, when a window of a porch in a home is embodied as a transparent display apparatus, a user may see various multimedia contents through a large size window of the porch to enhance user satisfaction.

A related art transparent three-dimensional (3D) display may not display a 3D image that may be seen on front and rear surfaces of the display. In addition, in order to provide autonomy in terms of a user location, a head tracking system appropriate for only one user is applied. These problems may restrict a related art transparent 3D display from being used as a digital signal display. A parallax barrier may provide a multi-view 3D display for providing user autonomy to support a plurality of users.

However, the optical transmittance of a parallax barrier is very low. Thus, a display has low transmittance. A lenticular lens may be used instead of the parallax barrier. However, when the lenticular lens is used, although the light transmittance of an image panel is increased, a refractive value of the lenticular lens is not high, which causes an image to not be seen by a user. Accordingly, problems arise in that a user may not see a clear image of an object positioned behind a display.

SUMMARY

Exemplary embodiments may overcome the above disadvantages and other disadvantages not described above. Also, the exemplary embodiments are not required to overcome the disadvantages described above, and an exemplary embodiment may not overcome any of the problems described above.

The exemplary embodiments may provide a display apparatus which allows an object positioned behind a display to be clearly seen while providing a three-dimensional (3D) image.

According to an aspect of an exemplary embodiment, a display apparatus includes a transmissive image panel configured to display a multi-view image, and a first transmissive backlight panel and a second transmissive backlight panel arranged at a predetermined distance from the transmissive image panel, and the first transmissive backlight panel and the second transmissive backlight panel are parallel to the transmissive image panel, wherein the first backlight panel distributes the multi-view image in a first viewing zone differently from the second backlight panel distribution of the multi-view image in a second viewing zone.

The first backlight panel and the second backlight panel may include a light source disposed on one surface so as to emit light toward the transmissive image panel.

The first backlight panel and the second backlight panel may include a plurality of light emitting points or a plurality of light emitting lines.

The first backlight panel and the second backlight panel may be transparent organic light emitting diode (OLED) light panels.

The first backlight panel and the second backlight panel may include an edge-type light guide plate configured to connect light to the outside.

The first backlight panel and the second backlight panel may include an edge-type light guide plate which includes a blue-violet illumination with a plurality of points or a plurality of lines formed of phosphor materials.

The transmissive image panel may be a liquid crystal display (LCD) panel.

The LCD panel may be a field sequential color (FSC) LCD image panel.

The display apparatus may further include a polymer-dispersed liquid crystal (PDLC) panel disposed between the transmissive image panel and one backlight panel of the first backlight panel and the second backlight panel, wherein the PDLC panel may be switched between a transparent state and a dispersed state.

According to an aspect of an exemplary embodiment, a display apparatus includes an image panel which includes a plurality of pixels and is configured to display a multi-view image, and a plurality of thin light emitting lines which are arranged at a predetermined distance from the image panel, wherein each of the thin light emitting lines are arranged at opposite surfaces of the image panel and distribute the multi-view image for a respective viewing zone different from a respective viewing zone for each of remaining thin light emitting lines.

Additional and/or other aspects and advantages of the exemplary embodiments will be set forth in part in the description which follows and, in part, will be obvious from the description, or may be learned by practice.

BRIEF DESCRIPTION OF THE DRAWINGS

The above and/or other aspects of the exemplary embodiments will be more apparent by describing certain exemplary embodiments with reference to the accompanying drawings, in which.

DETAILED DESCRIPTION OF THE EXEMPLARY EMBODIMENTS

Certain exemplary embodiments will now be described in greater detail with reference to the accompanying drawings.

Figure 1:
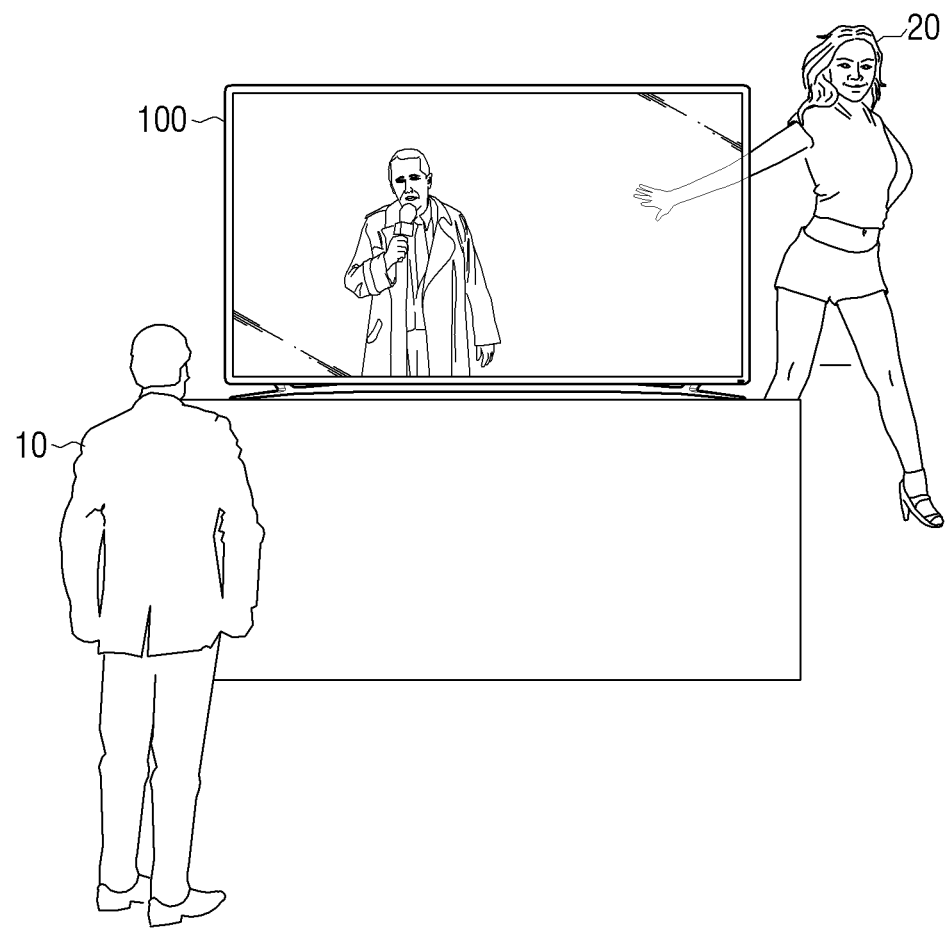
FIG. 1 is a diagram for explanation of a schematic operation of a display apparatus according to an embodiment.

FIG. 1 is a diagram for explanation of a schematic operation of a display apparatus 100 according to an embodiment.

The display apparatus 100 according to an embodiment may be embodied as a transparent display used in advertisement, digital signal system, and telepresence. For example, the display apparatus 100 may be embodied in the form of, for example, a large format display (LFD), a digital information display (DID), etc. However, embodiments are not limited to the above embodiments.

As light is transmitted in opposite directions, the display apparatus 100 may output an image from a front surface of a screen and may also output an image from a rear surface as light.

For example, a first user 10 positioned in front of the display apparatus 100 may see an image displayed on the front surface of the display apparatus 100. Simultaneously, a second user 20 positioned at an opposite side to the first user 10, in other words, the second user 20 positioned at a rear side of the display apparatus 100 may see an image displayed on the rear surface of the display apparatus 100.

A liquid crystal display (LCD) panel may be used as a panel of the display apparatus 100. Two or more backlight panels may be disposed on front and rear surfaces of the LCD panel so as to transmit light in opposite directions.

In addition, the LCD panel and backlight panel of the display apparatus 100 may be embodied to provide a three-dimensional (3D) image to the first user 10 and second user 20.

Figure 2:
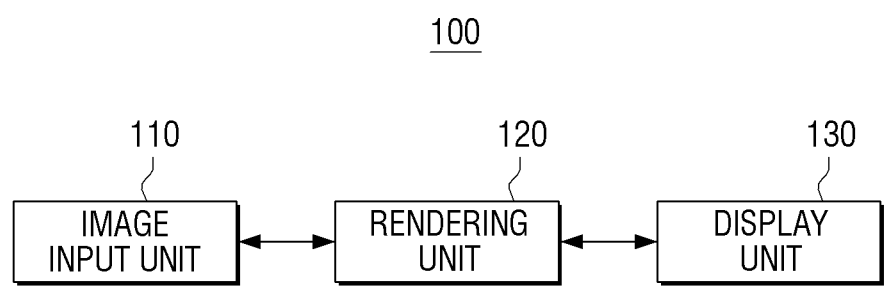
FIG. 2 is a block diagram of a display apparatus according to an embodiment.

FIG. 2 is a block diagram of the display apparatus 100 according to an embodiment.

Referring to FIG. 2, the display apparatus 100 includes an image input unit 110, a rendering unit 120, and a display unit 130.

The image input unit 110 receives a 3D image signal. The 3D image may be a stereo image. The stereo image includes two images captured by photographing one object at different angles, that is, a left-eye image and a right-eye image. The stereo image may be provided from various sources. For example, the image input unit 110 may receive a stereo image from a source such as a broadcast channel wired or wirelessly. In this case, the image input unit 110 may include various components such as a tuner, a demodulator, and an equalizer. In addition, the image input unit 110 may receive a stereo image reproduced by a recording medium reproduction unit for reproduction of various recording medium, such as a digital versatile disk (DVD), a bluray disk, and a memory card, and may directly receive a captured stereo image from a camera. In this case, the image input unit 110 may be configured to include various interfaces such as a universal serial bus (USB) interface, etc. The image input unit 110 may receive a stereo image from an external server such as a web server. In addition, a 3D image may be generated based on a 2D image according to a 2D-3D conversion scheme, or may be a multi-view image with three or more views The rendering unit 120 may render a multi-view image using a 3D image (or a multi-view image) or 2D image input through the image input unit 110. The rendering unit 120 may render the multi-view image based on the input 3D image or 2D image and depth information that is separately input from the image or render the multi-view image based on the input 3D image and depth information extracted from the corresponding 3D image.

For example, the rendering unit 120 may select one of 3D images, that is, a left-eye image and a left-eye image as a reference view (or a center view) to a leftmost view and rightmost view as a reference of the multi-view image. In this case, the rendering unit 120 may generate a leftmost view and a rightmost view based on corrected depth information corresponding to one of the left-eye image and the right-eye image, which is selected as the reference view, generate a plurality of interpolation views between a center view and the leftmost view, and generate a plurality of interpolation views between the center view and the rightmost view to render the multi-view image. However, embodiments are not limited thereto. It may be possible to generate an extrapolation view generated using an extrapolation scheme. Therefore, when the multi-view image is rendered based on the 2D image and the depth information, the 2D image may be selected as a center view.

The display unit 130 may display the multi-view image rendered by the rendering unit 120.

Hereinafter, the structure and operation of the display unit 130 according to an embodiment will be described with reference to drawings.

Figure 3:
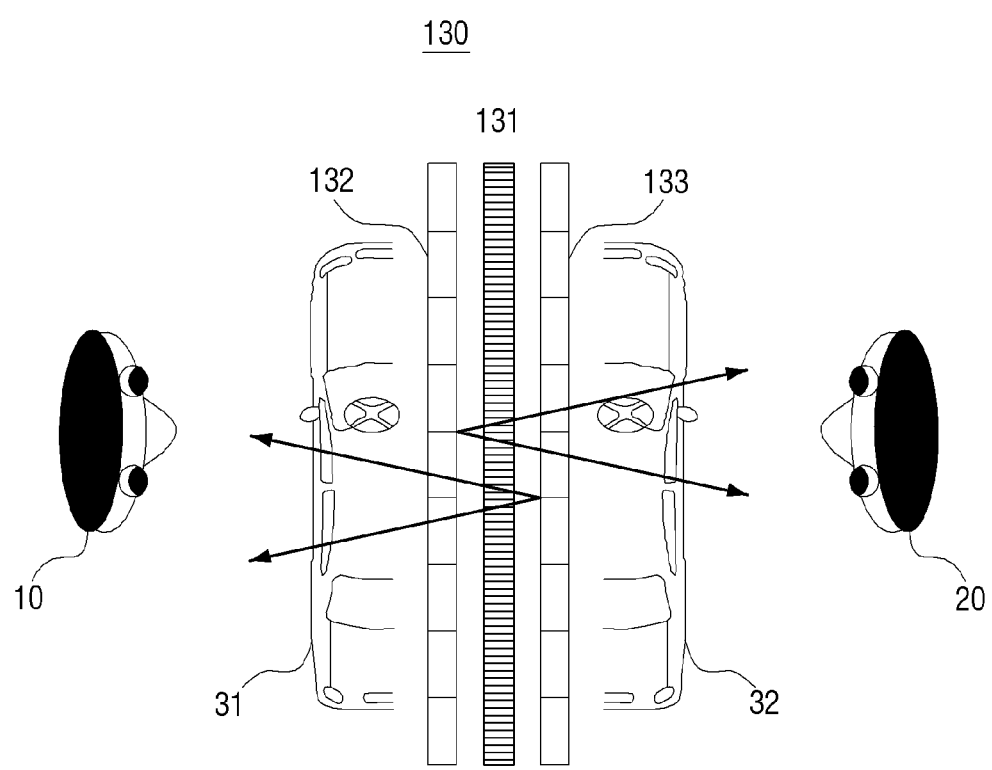
FIG. 3 is a diagram illustrating a structure of a display unit according to an embodiment.

FIG. 3 is a diagram illustrating a structure of the display unit 130 according to an embodiment.

As illustrated in FIG. 3, the display unit 130 includes an image panel unit 131, and first and second backlight panel units 132 and 133.

The image panel unit 131 may display a multi-view image and may be embodied as a transmissive panel.

In particular, the image panel unit 131 includes a plurality of pixels each of which includes a plurality of sub-pixels. A sub-pixel may include red (R), green (G), and blue (B) sub-pixels. In other words, pixels including R, G, and B sub-pixels may be arranged in a plurality of row and column directions to constitute a display panel. In this case, the image panel unit 131 may be embodied as a transparent liquid crystal display (LCD) panel.

A related art transparent LCD type apparatus refers to a transparent display apparatus obtained by removing a backlight unit from a currently used LCD apparatus and adding a pair of polarization plates, an optical film, a transparent thin film transistor, a transparent electrode, etc. The transmittance of the transparent LCD apparatus is reduced due to the polarization plate or the optical film and the optical efficiency of the transparent LCD apparatus is reduced since surrounding light is used instead of the backlight unit. However, it is advantageous to obtain a large area transparent display for user convenience and satisfaction.

Various related art display units such as a plasma display panel (PDP), an organic light emitting diode (OLED), a vacuum fluorescent display (VFD), a field emission display (FED), an electro luminescence display (ELD), etc., may be embodied. A transparent OLED type apparatus refers to a transparent display apparatus using an OLED that is capable of emitting light itself. Since an organic light emitting layer of the transparent OLED type apparatus is transparent, when transparent electrodes are used opposite electrodes, the transparent OLED type apparatus may be embodied as a transparent display apparatus. An OLED emits light while electrons and holes are injected from opposite sides of an organic light emitting layer and are combined in the organic light emitting layer. According to this principle, a transparent OLED apparatus injects electrons and holes into a desired location and displays information.

The image panel unit 131 displays an image frame. The image panel unit 131 may display an image frame in which a plurality of images with different views is sequentially and repeatedly arranged.

Although not illustrated in FIG. 3, the display apparatus 100 may further include a panel driver (not shown) for driving pixels of the image panel unit 131 according to pixel values of respective pixels constituting an image frame. Accordingly, in response to light, generated from the first and second backlight panel units 132 and 133, being incident on each pixel of the image panel unit 131, the image panel unit 131 adjusts transmittance with respect to light incident of each pixel according to an image signal and displays an image frame. The image panel unit 131 includes a liquid crystal layer and two electrodes formed on opposite surfaces thereof. In response to a voltage being applied to the two electrodes, an electric field is generated to move molecules of the liquid crystal layer between the two electrodes, thereby adjusting optical transmittance.

The first and second backlight panel units 132 and 133 may be arranged at a predetermined distance from opposite surfaces of the image panel unit 131 in parallel to the image panel unit 131. The first and second backlight panel units 132 and 133 may each be embodied as a transmissive panel.

The first and second backlight panel units 132 and 133 may be embodied to differently distribute a multi-view image displayed on the image panel unit 131 for respective viewing zones.

In addition, the first and second backlight panel units 132 and 133 may be embodied to generate vertical or inclined optical stripes that are uniformly distributed. In other words, the first and second backlight panel units 132 and 133 may be embodied in the form of thin light emitting lines positioned at a predetermined distance from pixel surfaces of the image panel unit 131. A line type light source may be designed to have high optical transmittance such that a viewer may see an image through a display. Thus, images with different views may be provided to left and right eyes of the first user 10 such that the first user 10 may view a stereoscopic 3D image 31. In addition, the first user 10 may view an actual object, for example, the second user 20 positioned behind the display apparatus 100. In a similar way, the second user 20 may view a stereoscopic 3D image 32 and an actual object, for example, the first user 10 positioned behind the display apparatus 100.

Although not illustrated, the display unit 130 may further include a polymer-dispersed liquid crystal (PDLC) panel unit (not shown) inserted between the image panel unit 131 and one of the first and second backlight panel units 132 and 133.

The PDLC may include a combination of liquid crystal and polymer matrix for fastening the liquid crystal and transmit and disperse light on liquid crystal in micro units using electricity to adjust light. The PDLC has characteristics whereby light transmission and dispersion may be electrically controlled.

Based on the characteristics, a PDLC panel unit (not shown) may be embodied to be switched between a transparent state and a dispersed state and may provide switching between a 3D mode and a 2D mode. In other words, when the PDLC panel unit (not shown) is in a transparent state, the display unit 130 may operate in the 3D mode, and when the PDLC panel unit (not shown) is in dispersed mode, the display unit 130 may operate in the 2D mode.

Figure 4:
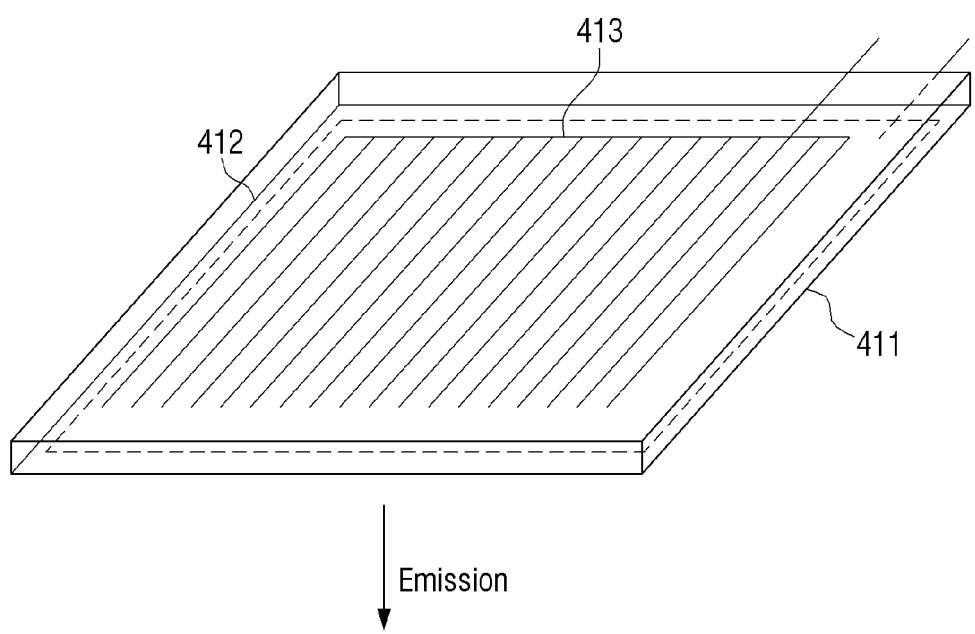
FIG. 4 is a diagram illustrating a structure of a backlight panel unit according to an embodiment.

FIG. 4 is a diagram illustrating a structure of a backlight panel unit according to an embodiment. Hereinafter, for convenience, the structure of the first backlight panel unit 132 will be described below. However, one of ordinary skill in the art would also understand that, the second backlight panel unit 133 may have the same structure as the first backlight panel unit 132.

As illustrated in FIG. 4, the first backlight panel unit 132 includes an organic phosphor layer 411, a common electrode 412, and a grid electrode 413. As illustrated in FIG. 4, the first backlight panel unit 132 may include a transparent OLED panel having corresponding electrode structures.

The organic phosphor layer 411 may be inserted between the common electrode 412 and the grid electrode 413. The common electrode 412 may be manufactured as a transparent electric conductive film such as indium tin oxide (ITO). In addition, the grid electrode 413 may be manufactured to be opaque or transparent.

The common electrode 412 and the grid electrode 413 may be formed on a transparent glass substrate via deposition.

When the grid electrode 413 is opaque, the first backlight panel unit 132 may emit light in one direction as illustrated in FIG. 4. The direction may be a direction toward the image panel unit 131 in FIG. 2.

As described above, the first backlight panel unit 132 including the grid electrode 413 includes light emitting lines (or light emitting points). A pitch between grids is the same as a pitch required for light lines.

When a user sees an image through a display, the opaque grid electrode 413 reduces average light transmittance of display. However, each electrode in a multi-view display is formed to be thinner than a gap between electrodes. Thus, a reduction ratio in light is not high. For example, when a multi-view 3D image with 9 views is provided, the grid electrode 413 shields only about 11% of original light. Accordingly, display transmittance is not a serious issue. The first backlight panel unit 132, that is, an OLED panel includes a planar layer. Thus, an object seen through the display may be seen clearly without distortion.

FIGS. 5A to 5G are diagrams illustrating structures of backlight panel units according to various embodiments.

Figure 5A:
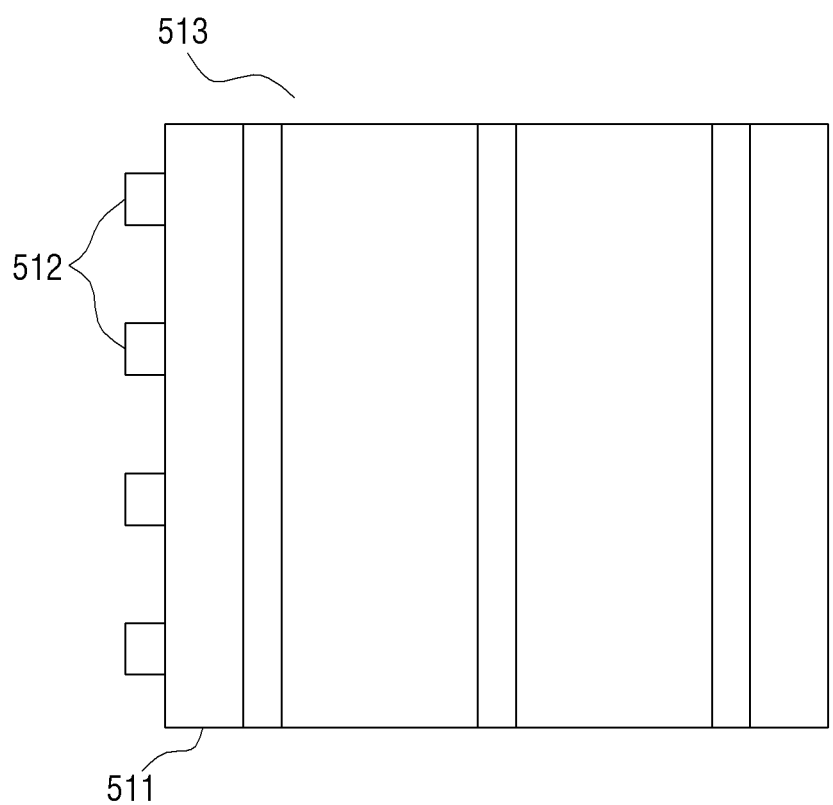
FIGS. 5A to 5G are diagrams illustrating structures of backlight panel units according to various embodiments.
Figure 5B:
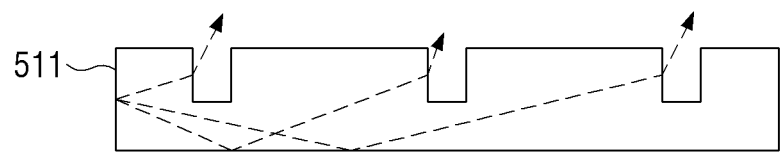
Figure 5C:
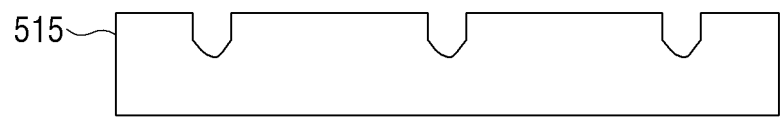
Figure 5D:
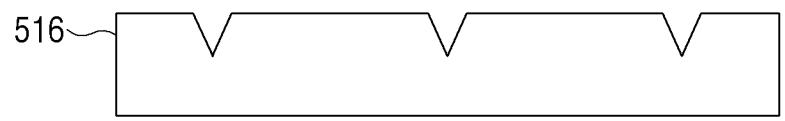

As illustrated in FIGS. 5A and 5B, each of the first and second backlight panel units 132 and 133 may include a transparent light guide including a side light with grooves that are uniformly arranged.

The light guide plate 511 is illuminated by a light emitting diode (LED) array 512. Light beams are moved into a light guide, as indicated by broken lines in FIG. 5B. The light guide includes grooves 513 that connect light beams to the outside.

Figure 5E:
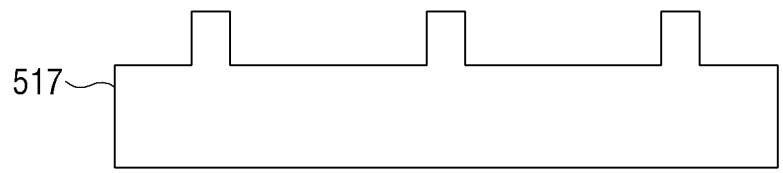
Figure 5F:
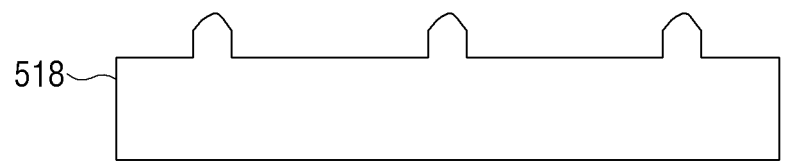
Figure 5G:
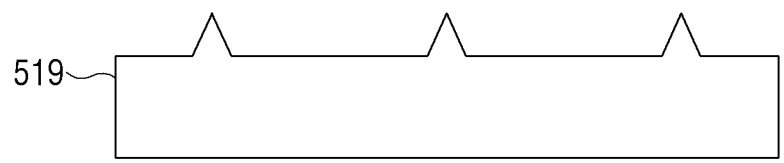

A sectional view of the groove 513 may have a circular shape 515 (illustrated in FIG. 5C) and a triangular shape 516 (illustrated in FIG. 5D), in addition to a rectangular shape 511 (illustrated in FIG. 5B). As necessary, instead of grooves, ribs 517 to 519 (as illustrated in FIGS. 5E, 5F, and 5G) having the same shape may each function as a component that connects light to the outside.

A pitch between grooves or ribs needs to be the same as a predetermined pitch for light emitting lines. The first and second backlight panel units 132 and 133 may have the same design and light emitting line pitch, but may have different designs and/or pitches.

The image panel unit 131, that is, an LCD panel may be an LCD panel that is embodied as a transparent display. A polarizer disposed on a front surface and rear surface of the LCD panel has a surface that has high transmittance and emits light.

In addition, in order to enhance the transmittance of a display, the LCD panel may be embodied as an LCD panel employing a field sequential color (FSC) driving method. According to the FSC driving method, LED arrays 512 with different colors may be embodied to provide color sequential illumination without a color filter in order to display color. For example, RGB, RGBW, etc., may be embodied.

For example, when the LED arrays 512 are embodied R, G, and B LEDs, the R, G, and B LEDs may be sequentially driven. Thus, mixed colors may be displayed according to an afterimage effect regarding human eyes. In more detail, time to display one frame on a panel is divided into three times for red, green, and blue, and respective backlights may sequentially emit light at time intervals. According to the FSC driving method, data input about RGB with respect to a liquid crystal panel sequentially occurs at the same ratio (R:G:B=1: 1:1) in one vertical synchronization period, and light sources of backlights corresponding to the data input are synchronized in the same manner such that R, G, and B light sources are sequentially illuminated. In this case, each light source may be an LED lamp or a phosphor lamp, and the R, G, and B light sources may be sequentially arranged.

According to another embodiment, the first and second backlight panel units 132 and 133, that is, a transparent backlight may be embodied as including a blue-violet LED array 512. In this case, a display apparatus may include a light guide plate that is formed of an optical transparent material and has white phosphor lines that are uniformly formed via deposition on a planar surface with an edge illuminated by the blue-violet) LED array 512. A light emitting line in this backlight may be indicated by a light emitting phosphor emitted by blue-violet light moved in the light guide. In order to uniformly reduce vertical and horizontal resolution, light emitting lines may be arranged in a predetermined inclined direction.

As described above, various embodiments may provide a transparent display that has high transparency while providing a clear 3D image.

Methods according to the aforementioned various embodiments may be programmed and stored in various storage media. Thus, the methods according to the aforementioned various embodiments may be embodied in various types of electronic devices for execution of a storage medium.

A non-transitory computer readable medium is a medium that semi-permanently stores data and from which data is readable by a device, but not a medium that stores data for a short time, such as register, a cache, a memory, and the like. In detail, the aforementioned various applications or programs may be stored in the non-transitory computer readable medium, for example, a compact disc (CD), a digital versatile disc (DVD), a hard disc, a bluray disc, a universal serial bus (USB), a memory card, a read only memory (ROM), and the like, and may be provided.

The foregoing exemplary embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
    a transmissive image panel configured to display a multi-view image; and
    a first transmissive backlight panel and a second transmissive backlight panel arranged at a predetermined distance from the transmissive image panel, and the first transmissive backlight panel and the second transmissive backlight panel are parallel to the transmissive image panel,
    wherein the first backlight panel distributes the multi-view image in a first viewing zone differently from the second backlight panel distribution of the multi-view image in a second viewing zone.

2. The display apparatus as claimed in claim 1, wherein the first backlight panel and the second backlight panel comprise a light source disposed on one surface so as to emit light toward the transmissive image panel.

3. The display apparatus as claimed in claim 1, wherein the first backlight panel and the second backlight panel comprise a plurality of light emitting points or a plurality of light emitting lines.

4. The display apparatus as claimed in claim 1, wherein the first backlight panel and the second backlight panel are transparent organic light emitting diode (OLED) light panels.

5. The display apparatus as claimed in claim 1, wherein the first backlight panel and the second backlight panel comprise an edge-type light guide plate configured to connect light to the outside.

6. The display apparatus as claimed in claim 1, wherein the first backlight panel and the second backlight panel comprises an edge-type light guide plate which comprises a blue-violet illumination with a plurality of points or a plurality of lines formed of phosphor materials.

7. The display apparatus as claimed in claim 1, wherein the transmissive image panel is a liquid crystal display (LCD) panel.

8. The display apparatus as claimed in claim 7, wherein the LCD panel is a field sequential color (FSC) LCD image panel.

9. The display apparatus as claimed in claim 1, further comprising a polymer-dispersed liquid crystal (PDLC) panel disposed between the transmissive image panel and one backlight panel of the first backlight panel and the second backlight panel,
    wherein the PDLC panel is switched between a transparent state and a dispersed state.

10. A display apparatus comprising:
    an image panel which includes a plurality of pixels and is configured to display a multi-view image; and
    a plurality of thin light emitting lines which are arranged at a predetermined distance from the image panel,
    wherein each of the thin light emitting lines are arranged at opposite surfaces of the image panel and distribute the multi-view image for a respective viewing zone differently from a respective viewing zone for each of remaining thin light emitting lines.

11. The display apparatus as claimed in claim 10, wherein the plurality of thin light emitting lines comprise a first light emitting line and a second light emitting line arranged at opposite surfaces of the image panel.

12. The display apparatus as claimed in claim 10, wherein the image panel comprises a transmissive panel.

13. The display apparatus as claimed in claim 12, wherein the transmissive panel is a liquid crystal display (LCD) panel.

14. The display apparatus as claimed in claim 10, further comprising:

a polymer-dispersed liquid crystal (PDLC) panel disposed between the image panel and one of the plurality of thin light emitting lines.

15. The display apparatus as claimed in claim 14, wherein the PDLC panel switches between a transparent state to operate in a three-dimensional (3D) mode and a dispersed state to operate in a two-dimensional (2D) mode.

* * * * *